United States Patent
Eckel et al.

(10) Patent No.: US 12,208,491 B2
(45) Date of Patent: Jan. 28, 2025

(54) USE OF MAGNETICS WITH MAGNETIZABLE ABRASIVE PARTICLES, METHODS, APPARATUSES AND SYSTEMS USING MAGNETICS TO MAKE ABRASIVE ARTICLES

(71) Applicant: 3M INNOVATIVE PROPERTIES COMPANY, St. Paul, MN (US)

(72) Inventors: Joseph B. Eckel, Vadnais Heights, MN (US); Aaron K. Nienaber, Maplewood, MN (US); Ronald D. Jesme, Plymouth, MN (US); Samad Javid, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 521 days.

(21) Appl. No.: 16/478,638

(22) PCT Filed: Jan. 10, 2018

(86) PCT No.: PCT/US2018/013074
§ 371 (c)(1),
(2) Date: Jul. 17, 2019

(87) PCT Pub. No.: WO2018/136271
PCT Pub. Date: Jul. 26, 2018

(65) Prior Publication Data
US 2019/0344403 A1    Nov. 14, 2019

Related U.S. Application Data

(60) Provisional application No. 62/448,131, filed on Jan. 19, 2017.

(51) Int. Cl.
*B24D 11/00* (2006.01)
*B24D 18/00* (2006.01)
*C09K 3/14* (2006.01)

(52) U.S. Cl.
CPC ........ *B24D 11/001* (2013.01); *B24D 18/0072* (2013.01); *C09K 3/1409* (2013.01); *C09K 3/1436* (2013.01)

(58) Field of Classification Search
CPC .... B24D 11/001; B24D 18/0072; B24D 3/34; B24D 11/00; B24D 18/00; B24D 11/02; C09K 3/1409; C09K 3/1436; C09K 3/14
See application file for complete search history.

(56) References Cited

U.S. PATENT DOCUMENTS

| | | |
|---|---|---|
| 1,930,788 A | 10/1933 | Buckner |
| 2,370,636 A | 3/1945 | Carlton |

(Continued)

FOREIGN PATENT DOCUMENTS

| | | |
|---|---|---|
| CN | 1830626 | 9/2006 |
| CN | 101353566 | 1/2009 |

(Continued)

OTHER PUBLICATIONS

Barbee, "Microstructure of Amorphous 304 Stainless Steel-Carbon Alloys Synthesized by Magnetron Sputter Deposition," Thin Solid Films, Oct. 1979, vol. 63, No. 01, pp. 143-150.

(Continued)

*Primary Examiner* — Pegah Parvini
*Assistant Examiner* — Marites A Guino-O Uzzle (57) ABSTRACT

According to one embodiment, a method of making an abrasive layer on a backing is disclosed. The method can comprise: providing a distribution tool having a dispensing surface with cavities, providing a backing having a first major surface, supplying magnetizable abrasive particles to the dispensing surface such that at least one of the magnetizable abrasive particles is disposed in a respective one of the cavities, applying a magnetic field to retain the magnetizable abrasive particles disposed in the cavities, aligning (Continued)

the backing with the dispensing surface with the first major surface facing the dispensing surface, transferring the magnetizable abrasive particles from the cavities to the backing, sequent to or simultaneous with transferring the abrasive particles, removing or changing a magnetic field so the magnetic field no longer retains the magnetizable abrasive particles in the cavities.

8 Claims, 6 Drawing Sheets

(56) References Cited

U.S. PATENT DOCUMENTS

| | | | |
|---|---|---|---|
| 2,857,879 | A | 10/1958 | Johnson |
| 2,947,616 | A | 8/1960 | Coes, Jr. |
| 3,306,719 | A | 2/1967 | Fringhian |
| 3,495,960 | A | 2/1970 | Schladitz |
| 3,625,666 | A | 12/1971 | James |
| 3,918,217 | A | 11/1975 | Oliver |
| 4,008,055 | A | 2/1977 | Phaal |
| 4,246,004 | A | 1/1981 | Busch |
| 4,314,827 | A | 2/1982 | Leitheiser |
| 4,612,242 | A | 9/1986 | Vesley |
| 4,623,364 | A | 11/1986 | Cottringer |
| 4,744,802 | A | 5/1988 | Schwabel |
| 4,770,671 | A | 9/1988 | Monroe |
| 4,881,951 | A | 11/1989 | Wood |
| 4,916,869 | A | 4/1990 | Oliver |
| 5,009,675 | A | 4/1991 | Kunz |
| 5,181,939 | A | 1/1993 | Neff |
| 5,201,916 | A | 4/1993 | Berg |
| 5,366,523 | A | 11/1994 | Rowenhorst |
| 5,380,390 | A | 1/1995 | Tselesin |
| 5,500,273 | A | 3/1996 | Holmes |
| RE35,570 | E | 7/1997 | Rowenhorst |
| 5,817,204 | A | 10/1998 | Tselesin |
| 5,891,204 | A | 4/1999 | Neff |
| 5,984,988 | A | 11/1999 | Berg |
| 6,083,631 | A | 7/2000 | Neff |
| 6,120,568 | A | 9/2000 | Neff |
| 7,727,931 | B2 | 6/2010 | Brey |
| 8,034,137 | B2 | 10/2011 | Erickson |
| 8,142,531 | B2 | 3/2012 | Adefris |
| 8,262,758 | B2 * | 9/2012 | Gao ............... B24D 18/00 118/640 |
| 8,698,394 | B2 | 4/2014 | Mccutcheon |
| 2005/0218566 | A1 | 10/2005 | Suzuki |
| 2008/0131705 | A1 | 6/2008 | Colburn |
| 2008/0289262 | A1 | 11/2008 | Gao |
| 2011/0088330 | A1 | 4/2011 | Beekman |
| 2013/0203328 | A1 | 8/2013 | Givot |
| 2013/0244552 | A1 | 9/2013 | Lee |
| 2013/0252521 | A1 | 9/2013 | Kasashima |
| 2013/0252522 | A1 | 9/2013 | Kasashima |
| 2013/0344786 | A1 | 12/2013 | Keipert |
| 2014/0000176 | A1 | 1/2014 | Moren |
| 2014/0106126 | A1 | 4/2014 | Gaeta |
| 2014/0290147 | A1 | 10/2014 | Seth |
| 2014/0291895 | A1 | 10/2014 | Kanade |
| 2016/0144480 | A1 * | 5/2016 | Eugster ............... B24D 5/00 51/307 |
| 2016/0177154 | A1 | 6/2016 | Josseaux |
| 2016/0221153 | A1 | 8/2016 | Rizzo, Jr. |
| 2016/0311081 | A1 | 10/2016 | Culler |
| 2016/0311084 | A1 * | 10/2016 | Culler ............... B24D 11/001 |
| 2016/0375556 | A1 * | 12/2016 | Seth ............... B24D 18/0072 451/539 |

FOREIGN PATENT DOCUMENTS

| | | |
|---|---|---|
| CN | 103590090 | 2/2014 |
| CN | 104191385 | 12/2014 |
| CN | 104999385 | 10/2015 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 1122718 | 8/2001 |
| GB | 396231 | 8/1933 |
| GB | 1477767 | 6/1977 |
| JP | 63-232947 | 9/1988 |
| JP | H07-078509 | 3/1995 |
| JP | H11-165252 | 6/1999 |
| JP | 2002-053367 | 2/2002 |
| JP | 2004-098265 | 4/2004 |
| JP | 2004-098266 | 4/2004 |
| JP | 2005-153106 | 6/2005 |
| JP | 2012-131017 | 7/2012 |
| JP | 2012-131018 | 7/2012 |
| JP | 2015-155142 | 8/2015 |
| SU | 1495100 | 7/1989 |
| WO | WO 94/027833 | 12/1994 |
| WO | WO 2010/041645 | 4/2010 |
| WO | WO 2012/112305 | 8/2012 |
| WO | WO 2015/100018 | 7/2015 |
| WO | WO 2015/100020 | 7/2015 |
| WO | WO 2015/100220 | 7/2015 |
| WO | WO 2016/044158 | 3/2016 |
| WO | WO 2016/064726 | 4/2016 |
| WO | WO 2016/081302 | 5/2016 |
| WO | WO 2016/196795 | 12/2016 |
| WO | WO 2016/205267 | 12/2016 |
| WO | WO-2016196795 A1 * | 12/2016 ......... B24D 18/0072 |
| WO | WO 2017/007703 | 1/2017 |
| WO | WO 2017/007714 | 1/2017 |
| WO | WO 2017/083255 | 5/2017 |
| WO | WO 2017/136188 | 8/2017 |
| WO | WO 2018/080703 | 5/2018 |
| WO | WO 2018/080704 | 5/2018 |
| WO | WO 2018/080705 | 5/2018 |
| WO | WO 2018/080755 | 5/2018 |
| WO | WO 2018/080756 | 5/2018 |
| WO | WO 2018/080765 | 5/2018 |
| WO | WO 2018/080784 | 5/2018 |
| WO | WO 2018/080799 | 5/2018 |

OTHER PUBLICATIONS

Rampal, "Comparing the Magnetic Abrasives by Investigating the Surface Finish," Journal of Engineering, Computers & Applied Sciences, Oct. 2012, vol. 01, No. 01, pp. 20-24.

International Search Report for PCT International Application No. PCT/US2018/013074, mailed on Apr. 30, 2018, 4 pages.

* cited by examiner

USE OF MAGNETICS WITH MAGNETIZABLE ABRASIVE PARTICLES, METHODS, APPARATUSES AND SYSTEMS USING MAGNETICS TO MAKE ABRASIVE ARTICLES

CROSS REFERENCE TO RELATED APPLICATIONS

This application is a national stage filing under 35 U.S.C. 371 of PCT/US2018/013074, filed Jan. 10, 2018, which claims the benefit of U.S. Provisional Application No. 62/448,131 filed Jan. 19, 2017, the disclosures of which are incorporated by reference in their entireties herein.

TECHNICAL FIELD

This document pertains generally, but not by way of limitation, to abrasive particles, abrasive articles, and related apparatuses, systems and methods.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Coated abrasive articles are conventionally coated by either drop coating or electrostatic coating of the abrasive particles onto a resin-coated backing. Of the two methods, electrostatic coating has been often preferred, as it provides some degree of orientation control for particles having an aspect ratio other than one.

In general, positioning and orientation of the abrasive particles and their cutting points are important in determining abrasive performance and durability. PCT International Publ. No. WO 2012/112305 A2 (Keipert) discloses coated abrasive articles manufactured through use of precision screens having precisely spaced and aligned non-circular apertures to hold individual abrasive particles in fixed positions that can be used to rotationally align a surface feature of the abrasive particles in a specific z-direction rotational orientation. In that method, a screen or perforated plate is laminated to an adhesive film and loaded with abrasive particles. The orientation of the abrasive particles could be controlled by the screen geometry and the restricted ability of the abrasive particles to contact and adhere to the adhesive through the screen openings. Removal of the adhesive layer from the filled screen transferred the oriented abrasive particles in an inverted fashion to an abrasive backing. The method relies on the presence of adhesive which can be cumbersome, prone to detackifying (e.g., due to dust deposits) over time, and which can transfer to the resultant coated abrasive article creating the possibility of adhesive transfer to, and contamination of, a workpiece.

OVERVIEW

Spacing and orientation of abrasive particles in an abrasive article can be important for article cutting performance and durability. If the abrasive particles are inverted (so as to be base up) or are out of alignment with respect to a cutting direction, a premature breakdown of the abrasive article can occur. Conventional methods such as drop coating and electrostatic deposition provide a random distribution of spacing and particle clustering often results where two or more shaped abrasive particles end up touching each other near the tips or upper surfaces of the shaped abrasive particles. Clustering can lead to poor cutting performance due to local enlargement of bearing areas in those regions and inability of the shaped abrasive particles in the cluster to fracture and breakdown properly during use because of mutual mechanical reinforcement. Clustering can also create undesirable heat buildup compared to coated abrasive articles having more uniformly spaced shaped abrasive particles.

In view of the foregoing, the present inventors have recognized, among other things, that a variety of abrasive articles can benefit from more precise positioning and orientation of abrasive particles. As such the present inventors have developed processes, systems and apparatuses that use magnetic field(s) to control magnetizable abrasive particles. More particularly, the processes, systems and apparatuses use magnetic fields to retain or release the magnetizable abrasive particles from a distribution tool as desired during a fabrication process.

The processes, systems and apparatuses can position and orient the magnetizable abrasive particles as desired. In some embodiments, a non-random predetermined pattern for the magnetizable abrasive particles within the abrasive article can be achieved as a result of the distribution tool and the magnetic field. For example, the present disclosure provides a precisely-replicated tooling with cavities that are complementary in shape and size to the magnetizable abrasive particles being coated. This tooling with the cavities can provide an initial orientation and/or alignment for the magnetizable abrasive particles prior to application on a backing. The magnetic field applied to the magnetizable abrasive particles when received in the cavities can improve the propensity of the magnetizable abrasive particles to be retained by the cavities even in high speed manufacturing.

According to one exemplary embodiment, a method of making an abrasive layer on a backing is disclosed. The method can comprise the steps of: providing a distribution tool having a dispensing surface with cavities, providing a backing having a first major surface, supplying magnetizable abrasive particles to the dispensing surface such that at least one of the magnetizable abrasive particles is disposed in a respective one of the cavities, applying a magnetic field to retain the magnetizable abrasive particles disposed in the cavities, aligning the backing with the dispensing surface with the first major surface facing the dispensing surface, transferring the magnetizable abrasive particles from the cavities to the backing, and sequent to or simultaneous with transferring the abrasive particles, removing or changing a magnetic field so the magnetic field no longer retains the magnetizable abrasive particles in the cavities.

According to another exemplary embodiment, an abrasive particle positioning system is disclosed. The system can comprise: a distribution tool comprising: a carrier member having a dispensing surface and a back surface opposite the dispensing surface, wherein the carrier member has cavities formed therein, wherein the cavities extend into the carrier member and are open to the dispensing surface, magnetizable abrasive particles removeably disposed within at least some of the cavities, and a magnet applying a magnetic field to retain the magnetizable abrasive particles disposed in the cavities or remove the magnetizable abrasive particles from the cavities.

According to yet another exemplary embodiment, a coated abrasive article fabrication apparatus is disclosed.

The apparatus can comprise: a distribution tool having a dispensing surface with a plurality of cavities, a web path for a backing guiding the backing into close proximity with the distribution tool such that a first major surface of the backing is positioned facing the dispensing surface, magnetizable abrasive particles removeably received in the plurality of cavities, and a magnet applying a magnetic field to retain the magnetizable abrasive particles disposed in the cavities. Magnetizable abrasive particles are transferred from the plurality of cavities to the backing as the backing and the distribution tool come into the close proximity, and the magnetic field that retains the magnetizable abrasive particles in the cavities is selectively removed or changed prior to or simultaneous with transfer of the magnetizable abrasive particles from the plurality of cavities.

According to another exemplary embodiment, a method of making an abrasive layer on a backing is disclosed. The method can comprise the steps of: providing a distribution tool having a dispensing surface with cavities, providing a backing having a first major surface, supplying magnetizable abrasive particles to the dispensing surface such that at least one of the magnetizable abrasive particles is disposed in a respective one of the cavities, applying a vacuum to retain the magnetizable abrasive particles disposed in the cavities, aligning the backing with the dispensing surface with the first major surface facing the dispensing surface, transferring the magnetizable abrasive particles from the cavities to the resin coated backing and attaching the magnetizable abrasive particles to the resin layer, sequent to or simultaneous with transferring the abrasive particles, and applying a magnetic field to the magnetizable abrasive particles to at least partially facilitate transferring the magnetizable abrasive particles from the cavities.

As used herein:

The term "a", "an", and "the" are used interchangeably with "at least one" to mean one or more of the elements being described.

The term "and/or" means either or both. For example "A and/or B" means only A, only B, or both A and B.

The terms "including," "comprising," or "having," and variations thereof, are meant to encompass the items listed thereafter and equivalents thereof as well as additional items.

Unless specified or limited otherwise, the term "coupled" and variations thereof are used broadly and encompass both direct and indirect couplings.

The phrase "major surface" or variations thereof, are used to describe an article having a thickness that is small relative to its length and width. The length and width of such articles can define the "major surface" of the article, but this major surface, as well as the article, need not be flat or planar. For example, the above phrases can be used to describe an article having a first ratio ($R_1$) of thickness (e.g., in a Z direction that is orthogonal to a major surface of the article at any point along the major surface) to a first surface dimension of the major surface (e.g., width or length), and a second ratio ($R_2$) of thickness to a second surface dimension of the major surface, where the first ratio ($R_1$) and the second ratio ($R_2$) are both less than 0.1. In some embodiments, the first ratio ($R_1$) and the second ratio ($R_2$) can be less than 0.01; in some embodiments, less than 0.001; and in some embodiments, less than 0.0001. Note that the two surface dimensions need not be the same, and the first ratio ($R_1$) and the second ratio ($R_2$) need not be the same, in order for both the first ratio ($R_1$) and the second ratio ($R_2$) to fall within the desired range. In addition, none of the first surface dimension, the second surface dimension, the thickness, the first ratio ($R_1$), and the second ratio ($R_2$) need to be constant in order for both the first ratio ($R_1$) and the second ratio ($R_2$) to fall within the desired range.

The term "ceramic" refers to any of various hard, brittle, heat- and corrosion-resistant materials made of at least one metallic element (which can include silicon) combined with oxygen, carbon, nitrogen, or sulfur.

The term "conductive" means electrically conductive (e.g., at the level of a conductor), unless otherwise specified.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials can be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., unless otherwise specified.

The term "magnetizable" means that the item being referred to is magnetic or can be made magnetic using an applied magnetic field, and has a magnetic moment of at least 0.001 electromagnetic units (emu), in some cases at least 0.005 emu, and yet other cases 0.01 emu, up to and including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), in some cases at least about 100 gauss (10 mT), and in yet other cases at least about 1000 gauss (0.1 T).

The term "magnetizable" means capable of being magnetized or already in a magnetized state.

The term "shaped ceramic body" refers to a ceramic body that has been intentionally shaped (e.g., extruded, die cut, molded, screen-printed) at some point during its preparation such that the resulting ceramic body is non-randomly shaped. The term "shaped ceramic body" as used herein excludes ceramic bodies obtained by a mechanical crushing or milling operation.

The terms "precisely-shaped ceramic body" refers to a ceramic body wherein at least a portion of the ceramic body has a predetermined shape that is replicated from a mold cavity used to form a precursor precisely-shaped ceramic body that is sintered to form the precisely-shaped ceramic body. A precisely-shaped ceramic body will generally have a predetermined geometric shape that substantially replicates the mold cavity that was used to form the shaped abrasive particle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "substantially" means within 35 percent (within 30 percent, in yet other cases within 25 percent, in yet other cases within 20 percent, in yet other cases within 10 percent, and in yet other cases within 5 percent) of the attribute being referred to.

Features and advantages of the present disclosure will be further understood upon consideration of the detailed description as well as the appended claims.

This overview is intended to provide an overview of subject matter of the present patent application. It is not intended to provide an exclusive or exhaustive explanation of the invention. The detailed description is included to provide further information about the present patent application.

DETAILED DESCRIPTION

Magnetizable abrasive particles are described herein by way of example and can have various configurations. For example, the magnetizable abrasive particles can be constructed of various materials including but not limited to ceramics, metal alloys, composites or the like. Similarly, the magnetizable abrasive particles can be substantially entirely constructed of magnetizable material, can have magnetizable portions disposed therein (e.g., ferrous traces), or can have magnetizable portions disposed as layers on one or more surfaces thereof (e.g., one or more surfaces can be coated with a magnetizable material) according to some examples. The magnetizable abrasive particles can be shaped according to some examples. According to other examples the magnetizable abrasive particles can comprise crushed grains, agglomerates, or the like. Magnetizable abrasive particles can be used in loose form (e.g., free-flowing or in a slurry) or they can be incorporated into various abrasive articles (e.g., coated abrasive articles, bonded abrasive articles, nonwoven abrasive articles, and/or abrasive brushes).

Figure 1:
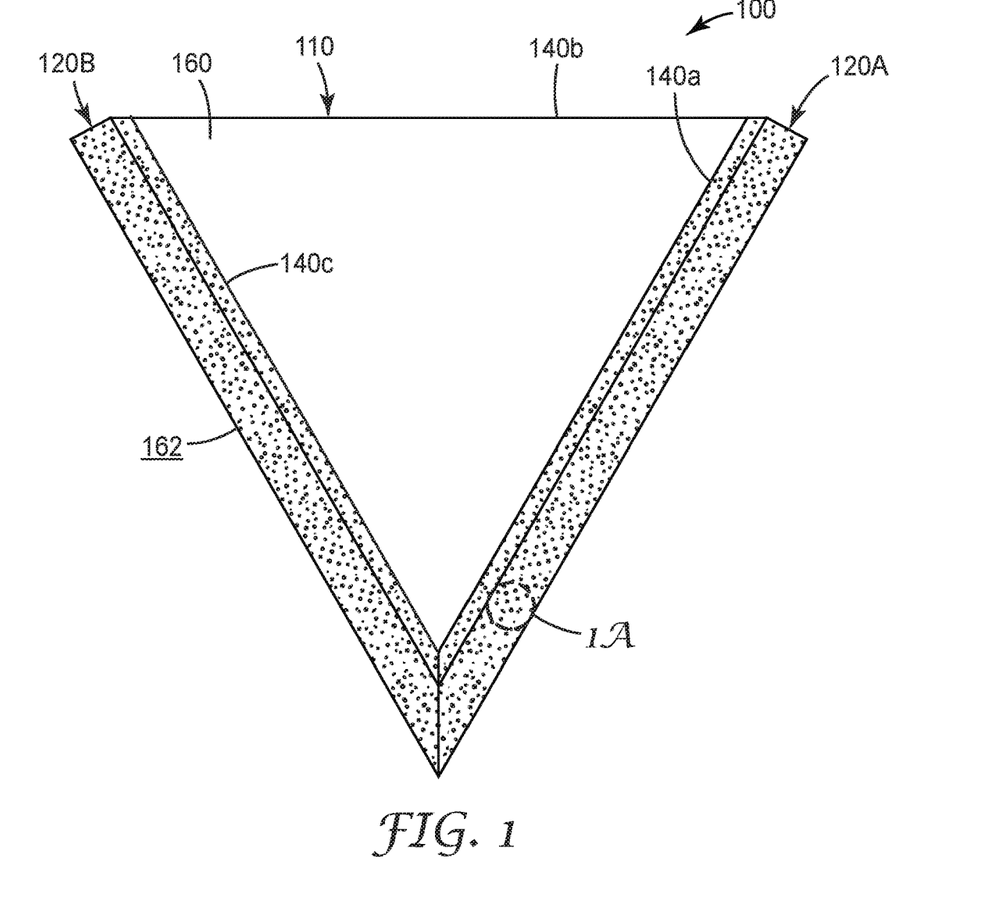
FIG. 1 is a schematic perspective view of an exemplary magnetizable abrasive particle 100 according to one embodiment of the present disclosure.
Figure 1A:
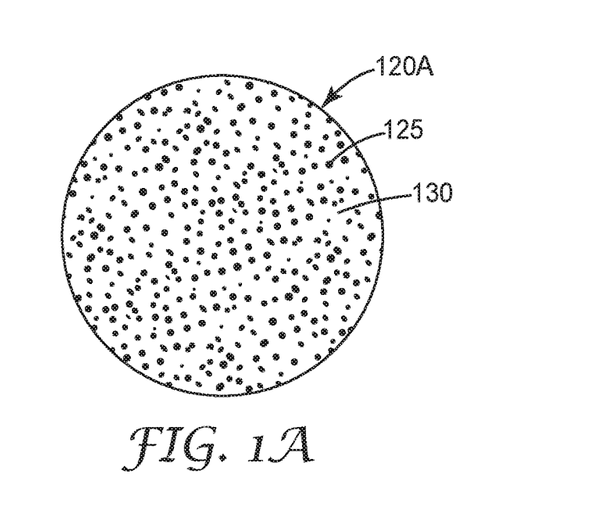
FIG. 1A is an enlarged view of region 1A in FIG. 1.

Referring now to FIGS. 1 and 1A, an exemplary magnetizable abrasive particle 100 is disclosed. The magnetizable abrasive particle 100 can have a shaped ceramic body 110 and magnetizable layers 120A and 120B. The magnetizable layers 120A and 120B are comprised of magnetizable particles 125 retained in a binder matrix 130 (also referred to simply as "binder") as further shown in FIG. 1A. The ceramic body 110 can have two opposed major surfaces 160, 162 connected to each other by three side surfaces 140a, 140b, 140c. The magnetizable layer 120A is disposed on side surface 140a of ceramic body 110 and the magnetizable layer 120B is disposed on the side surface 140c.

The magnetizable layer 120A or 120B can optionally extend somewhat onto other surfaces of the shaped ceramic body 110. In some embodiments, the magnetizable layer can extend to cover a majority of any surface of the shaped ceramic body 110 as desired. As shown, magnetizable layer 120A and 120B can be coextensive with side surface 140a and 140c, respectively. Magnetizable abrasive particles of the type shown can be aligned with the magnetizable layer-coated surface parallel to magnetic field lines of force as will be discussed subsequently.

In general, since orientation of the magnetic field lines tends to be different at the center and edge of a magnet it is also possible to create various desired orientations of the magnetizable abrasive particles during their inclusion into an abrasive article.

The magnetizable layer can be a unitary magnetizable material, or it can comprise magnetizable particles in a binder matrix. Suitable binders can be vitreous or organic, for example, as described for the binder matrix 130 hereinbelow. The binder matrix can be, for example selected from those vitreous and organic binders. The ceramic body can comprise any ceramic material (a ceramic abrasive material), for example, selected from among the ceramic (i.e., not including diamond) abrasive materials listed hereinbelow. The magnetizable layer can be disposed on the ceramic body by any suitable method such as, for example, dip coating, spraying, painting, physical vapor deposition, and powder coating. Individual magnetizable abrasive particles can have magnetizable layers with different degrees of coverage and/or locations of coverage. The magnetizable layer can be essentially free of (i.e., containing less than 5 weight percent of, in yet other cases containing less than 1 weight percent of) ceramic abrasive materials used in the ceramic body.

The magnetizable layer can consist essentially of magnetizable materials (e.g., >99 to 100 percent by weight of vapor coated metals and alloys thereof), or it can contain magnetic particles retained in a binder matrix. The binder matrix of the magnetizable layer, if present, can be inorganic (e.g., vitreous) or organic resin-based, and is typically formed from a respective binder precursor.

Magnetizable abrasive particles according to the present disclosure can be prepared, for example, by applying a magnetizable layer or precursor thereof to the ceramic body. Magnetizable layers can be provided by physical vapor deposition as discussed hereinbelow. Magnetizable layer precursors can be provided as a dispersion or slurry in a liquid vehicle. The dispersion or slurry vehicle can be made by simple mixing of its components (e.g., magnetizable particles, optional binder precursor, and liquid vehicle), for example. Exemplary liquid vehicles include water, alcohols (e.g., methanol, ethanol, propanol, butanol, ethylene glycol monomethyl ether), ethers (e.g., glyme, diglyme), and combinations thereof. The dispersion or slurry can contain additional components such as, for example, dispersant, surfactant, mold release agent, colorant, defoamer, and rheology modifier. Typically, after coating onto the ceramic bodies the magnetizable layer precursor is dried to remove most or all of the liquid vehicle, although this is not a requirement. If a curable binder precursor is used, then a curing step (e.g., heating and/or exposure to actinic radiation) generally follows to provide the magnetizable layer.

Vitreous binder can be produced from a precursor composition comprising a mixture or combination of one or more raw materials that when heated to a high temperature melt and/or fuse to form a vitreous binder matrix. Further disclosure of appropriate vitreous binders that can be used with the abrasive article can be found in U.S. Provisional Pat. Appl. Ser. Nos. 62/412,402, 62/412,405, 62/412,411, 62/412,416, 62/412,427, 62/412,440, 62/412,459, and 62/412,470, which are each incorporated herein by reference in their entirety.

In some embodiments, the magnetizable layer can be deposited using a vapor deposition technique such as, for example, physical vapor deposition (PVD) including magnetron sputtering. PVD metallization of various metals, metal oxides and metallic alloys is disclosed in, for example, U.S. Pat. No. 4,612,242 (Vesley) and U.S. Pat. No. 7,727,931 (Brey et al.). Magnetizable layers can typically be prepared in this general manner, but care should be generally taken to prevent the vapor coating from covering the entire surface of the shaped ceramic body. This can be accomplished by masking a portion of the ceramic body to prevent vapor deposition.

Examples of metallic materials that can be vapor coated include stainless steels, nickel, cobalt. Exemplary useful magnetizable particles/materials can comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, and alloys of samarium and cobalt (e.g., $SmCo_5$); MnSb; ferrites such as ferrite, magnetite; zinc ferrite; nickel ferrite; cobalt ferrite, magnesium ferrite, barium ferrite, and strontium ferrite; and combinations of the foregoing. In some embodiments, the magnetizable material comprises at least one metal selected from iron, nickel, and cobalt, an alloy of two or more such metals, or an alloy of at one such metal with at least one element selected from phosphorus and manganese. In some embodiments, the magnetizable material is an alloy containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron. Alloys of this type are available under the trade designation "ALNICO".

Useful abrasive materials that can be used as ceramic bodies include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minnesota, black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

As discussed previously, the body of the abrasive particle can be shaped (e.g., precisely-shaped) or random (e.g., crushed). Shaped abrasive particles and precisely-shaped ceramic bodies can be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Exemplary magnetizable materials that can be suitable for use in magnetizable particles can comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material comprises at least one metal selected from iron, nickel, and cobalt, an alloy of two or more such metals, or an alloy of at one such metal with at least one element selected from phosphorus and manganese. In some embodiments, the magnetizable material is an alloy (e.g., Alnico alloy) containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron.

The magnetizable particles can have any size, but can be much smaller than the ceramic bodies as judged by average particle diameter, in yet other cases 4 to 2000 times smaller, in yet other cases 100 to 2000 times smaller, and in yet other cases 500 to 2000 times smaller, although other sizes can also be used. In this embodiment, the magnetizable particles can have a Mohs hardness of 6 or less (e.g., 5 or less, or 4 or less), although this is not a requirement.

Figure 2:
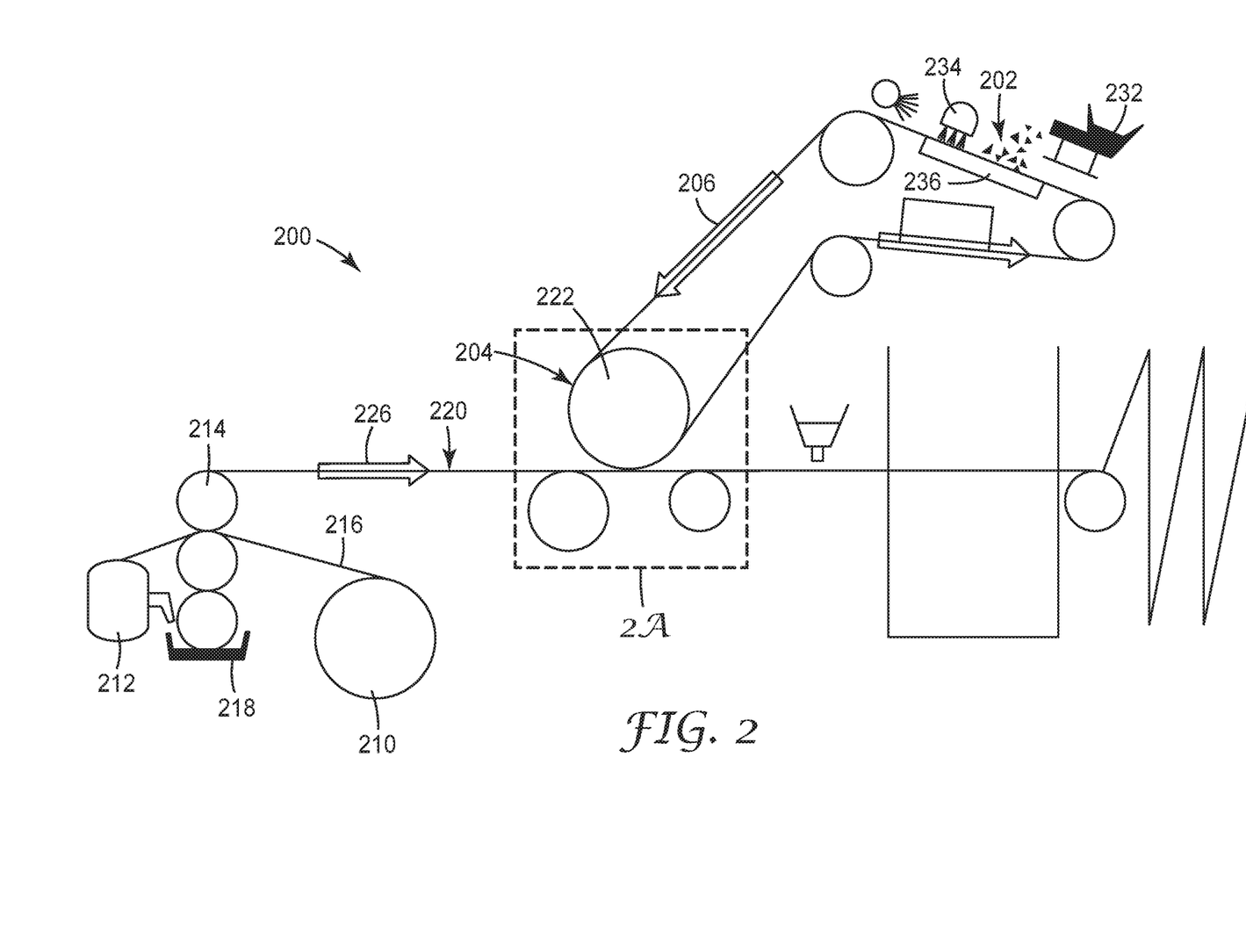
FIG. 2 is schematic view of an apparatus for making a coated abrasive article that can include the magnetizable abrasive particle of FIG. 1 according to an example of the present disclosure.

FIG. 2 shows an apparatus 200 for making coated abrasive articles according to one embodiment of the present disclosure. The apparatus 200 includes magnetizable abrasive particles 202 such as those previously illustrated and described. These magnetizable abrasive particles 202 can be removeably disposed within cavities of a distribution tool 204 as will be discussed subsequently. The apparatus 200 can have a first web path 206 guiding the distribution tool 204 through a coated abrasive article maker such that it passes adjacent to a portion of an outer circumference of an abrasive particle transfer roller 222. The apparatus 200 can also include, for example, an unwind 210, a make coat delivery system 212, and a make coat applicator 214. These components unwind a backing 216, deliver a make coat resin 218 via a make coat delivery system 212 to the make coat applicator 214 and apply the make coat resin to a first major surface 220 of the backing. Thereafter, the resin coated backing 216 is positioned by an idler roller 224 for application of the abrasive particles 202 to the first major surface 220 coated with the make coat resin 218. A second web path 226 for the resin coated backing 216 guides the resin coated backing through the coated abrasive article maker apparatus such that it passes adjacent to a portion of the outer circumference of the abrasive particle transfer roller 222 with the resin layer positioned facing the dispensing surface of the distribution tool 204, which can be positioned between the resin coated backing 216 and the outer circumference of the abrasive particle transfer roller 222. Suitable unwinds, make coat delivery systems, make coat resins, coat applicators and backings are known to those of skill in the art. The make coat delivery system 212 can be a simple pan or reservoir containing the make coat resin or a pumping system with a storage tank and delivery plumbing to translate the make coat resin to the needed location. The backing 216 can be a cloth, paper, film, nonwoven, scrim, or other web substrate. The make coat applicator can be, for example, a die coater, a roller coater, a spray system, or a rod coater. Alternatively, a pre-coated coated backing can be used for application of the abrasive particles to the first major surface.

Figure 2A:
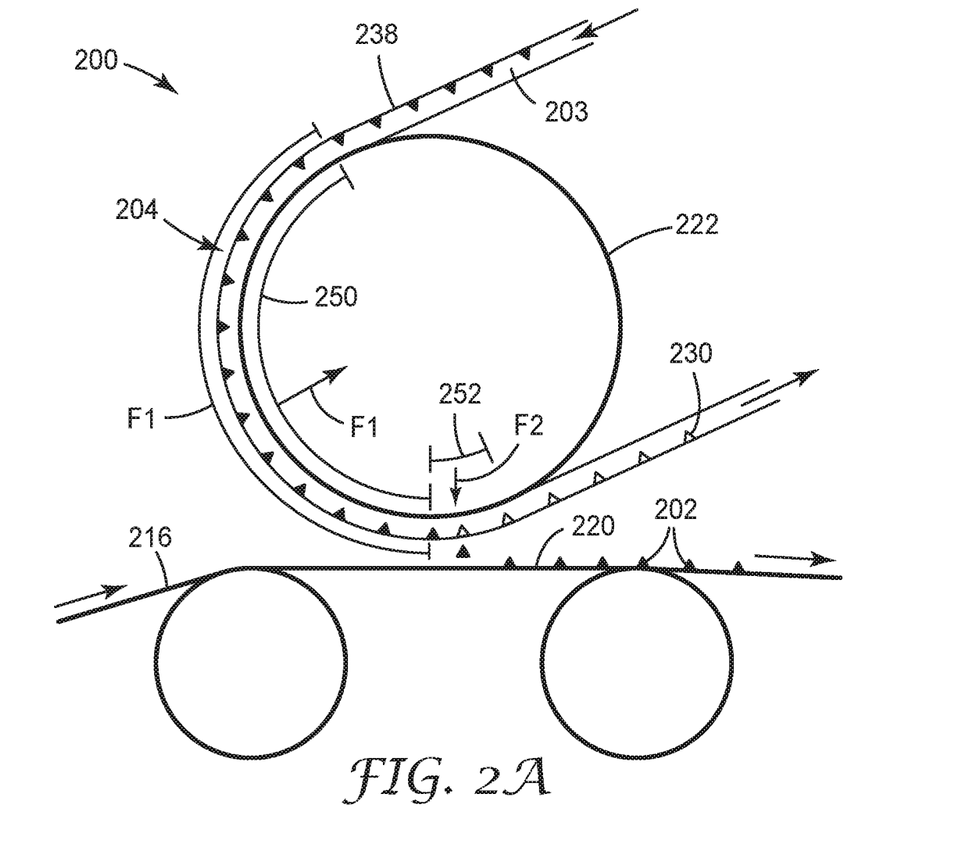
FIG. 2A is an enlarged view of a portion of the apparatus of FIG. 2 including a distribution tool according to an example of the present disclosure.

As shown in the enlargement of FIG. 2A, the distribution tool 204 can include a plurality of cavities 230 having a complimentary shape to the intended magnetizable abrasive particle 202 to be contained therein.

As shown in FIG. 2, an abrasive particle feeder 232 can supply at least some abrasive particles to the distribution tool 204. The abrasive particle feeder 232 can supply an excess of magnetizable abrasive particles 202 such that there are more abrasive particles present per unit length of the distribution tool 204 in the machine direction than cavities 230 (FIG. 2A) present. Supplying an excess of abrasive particles helps to ensure a majority to all of the cavities 230 within the distribution tool 204 are eventually filled with the magnetizable abrasive particles 202. The abrasive particle feeder 232 can be the same width as the distribution tool 204 and supplies the magnetizable abrasive particles 202 across the entire width of the distribution tool 204. The abrasive particle feeder 232 can be, for example, a vibratory feeder, a hopper, a chute, a silo, a drop coater, or a screw feeder.

Optionally, a filling assist member 234 can be provided after the abrasive particle feeder 232 to move the magnetizable abrasive particles 202 around on the surface of the distribution tool 204 and to help orientate or slide the abrasive particles into the cavities 230 (FIG. 2A). The filling assist member 234 can be, for example, a doctor blade, a felt wiper, a brush having a plurality of bristles, a vibration system, a blower or air knife, a vacuum box 236, one or more magnets or combinations thereof. The filling assist member 234 moves, translates, sucks, or agitates the magnetizable abrasive particles on the dispensing surface 238 (outside or outer facing surface of the distribution tool 204 in FIG. 2A) to place more magnetizable abrasive particles into the cavities.

Figure 3:
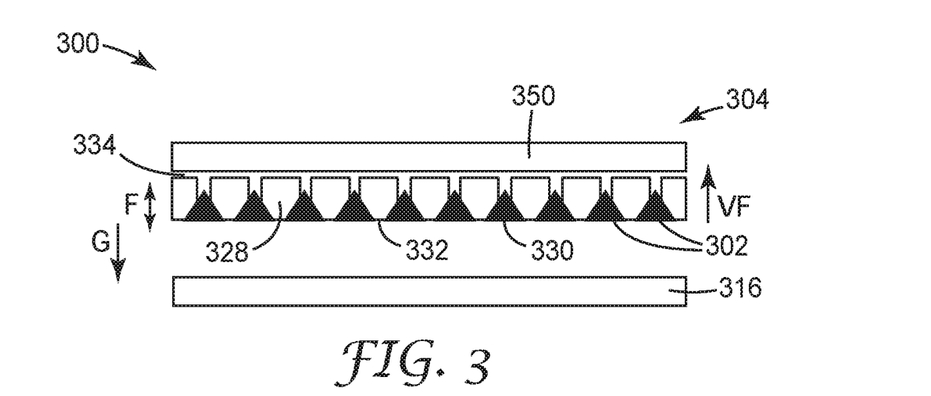
FIG. 3 is a schematic view of a portion of a distribution tool according to another embodiment with magnetizable abrasive particles retained therein and spaced from a backing according to an example of the present disclosure.

The vacuum box 236, if in conjunction with the distribution tool 204, can communicate with cavities 230 as will be further illustrated and described in reference to FIG. 3. This can be accomplished by passages extending through the distribution tool 204.

Further details regarding various additional elements and sub-assemblies that can be used with the apparatus 200 and the distribution tool 204 described herein can be found in PCT International Publ. Nos. WO2015/100020, WO2015/100220 and WO2015100018, which are each incorporated herein by reference in their entirety.

FIG. 2A shows the distribution tool 204 having a carrier member 203 designed to carry the magnetizable abrasive particles 202. The distribution tool 204 with the magnetizable abrasive particles 202 can pass closely adjacent the backing 216. The apparatus 200 as shown in FIG. 2A includes a magnet (a permanent or electromagnet) 250 disposed adjacent to the abrasive particle transfer roller 222. The magnet 250 exerts a first magnetic force (illustrated as F1) on the magnetizable abrasive particles 202 during at least a portion of the magnetizable abrasive particles 202 travel around the roller 222 when the particles become partially or totally inverted relative to the force of gravity and/or the backing 216.

For the purposes of this disclosure, the first magnetic force F1 can optionally be used to retain or move the magnetizable abrasive particles within the cavities 230 of the distribution tool 204 prior to transfer to the backing 216. The first magnetic force F1 can be substantially uniform over the magnetizable abrasive particles in the distribution tool 204, or it can be uneven, or even effectively separated into discrete sections. The orientation of the first magnetic force F1 is configured to retain the magnetizable abrasive particles within respective cavities 230.

Examples of magnetic field configurations and apparatuses for generating them are described in U.S. Patent Application. Publication. Nos. 2008/0289262 A1 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British Pat. No. (G. B.) 1 477 767 (Edenville Engineering Works Limited), which are each incorporated herein by reference in their entirety.

In some embodiments, a second magnet 252 (a permanent or electromagnet) having a second magnetic field (indicated as F2) can be used to urge the magnetizable abrasive particles 202 out of the cavities 230 and onto a first major surface 220 of the backing 216. According to further embodiments, rather than having a second magnet, the first magnet 250 can have a portion with a second polarity designed to urge the magnetizable abrasive articles from the cavities 230.

The urging illustrated can be done in tandem with gravity as in FIG. 2A. The backing 216 can have a make layer precursor (i.e., the binder precursor for the make layer) coated therein. As desired the magnetic abrasive particle 202 can maintain a vertical or somewhat inclined orientation relative to the horizontal backing 216. For example, a majority of the magnetizable abrasive particles 202 can have a major planar surface (previously discussed and illustrated with regard to FIG. 1) disposed at an angle of at least 70 degrees relative to the first major surface 220 of the backing 216 upon transfer to the backing 216. After at least partially curing the make layer precursor, the magnetizable abrasive particles 202 are fixed in their placement and orientation. In some embodiments, a size layer precursor can be disposed on at least a portion of the at least partially cured make layer precursor. The size layer precursor can be at least partially cured. An analogous process can be used for manufacture of slurry coated abrasive articles, except that the magnetic field acts on the magnetizable particles within the slurry. The above processes can also be carried out on nonwoven backings to make nonwoven abrasive articles.

FIG. 3 shows another embodiment comprising an abrasive article positioning system 300. The system 300 can include aspects of the apparatus 200 previously described and can include magnetizable abrasive particles 302, a distribution tool 304, a backing 316 and a magnet 350.

FIG. 3 shows the distribution tool 304 in a cross-web direction in complete inversion relative to the backing 316 and gravitational force G. The gravitational force G can aid in removal of the magnetizable abrasive particles 302 from the distribution tool 304 and facilitate transfer to the backing 316 according to the embodiment of FIG. 3. The distribution tool 304 can comprise a carrier member 328 having shaped cavities 330 that open to a dispensing surface 332 of the carrier member 328. The cavities 330 can be shaped to match a shape of the magnetizable abrasive particles 302. According to some examples, the carrier member 328 comprises a polymer and is flexible.

In the embodiment of FIG. 3, the distribution tool 304 can include passages 334 that communicate with each of the cavities 330. The passages 334 allow for the application of a vacuum force VF. The vacuum force VF can aid in the retention of the magnetizable abrasive particles 302 within the cavities 330. The vacuum force VF can be applied from a source such as the vacuum box previously illustrated.

The magnet 350 (a permanent or electromagnet) can be part of the distribution tool 304 and system 300 but may be spaced from the carrier member 328, the cavities 330 and the dispensing surface 332 as illustrated in FIG. 3. The magnet 350 can apply a magnetic field (indicated by F) to retain the magnetizable abrasive particles 302 disposed in the cavities 330 or remove the magnetizable abrasive particles 302 from the cavities 330 as previously illustrated in FIG. 2A. According to some embodiments, the magnetic force F that retains the magnetizable abrasive particles 302 in the cavities 330 can be selectively removed or changed prior to or simultaneous with transfer of the magnetizable abrasive particles 302 from the plurality of cavities 330. Removal of the magnetic force F can occur but removing power to the magnet 350 if the magnet 350 comprises an electromagnet or by positioning the magnet 350 such that the strength of the magnetic field is substantially reduced to zero as previously illustrated in FIG. 2A. In other embodiments, the magnetic force F can be changed (e.g., reversed in polarity, reduced in strength to a point where the gravitational force G exceeds the force applied on the magnetizable abrasive particles 302 by the magnetic force F) rather than being removed. It should be recognized that in other embodiments, the configuration of FIG. 3 can be reversed or otherwise oriented relative to the gravitational force G such that the gravitational force G may not help the magnetizable abrasive particles exit the cavities 330 in all cases.

Figure 4:
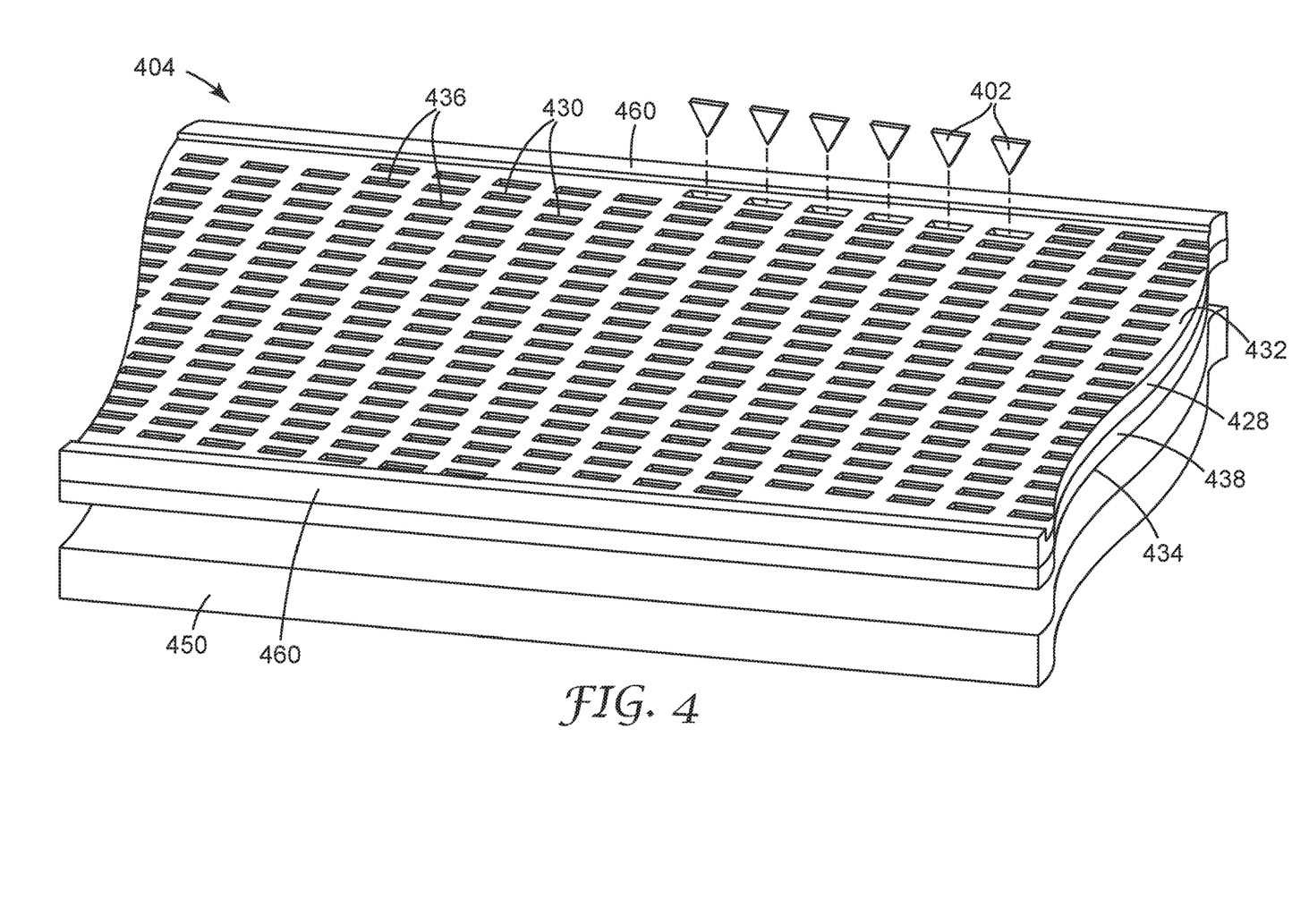
FIG. 4 is a schematic perspective view of a portion of an exterior surface of another embodiment of a distribution tool receiving magnetizable abrasive articles therein according to an example of the present disclosure.

FIG. 4 shows a portion of a distribution tool 404 in both cross-web and down-web directions with exemplary magnetizable abrasive particles 402 disposed adjacent thereto. A magnet 450 (permanent or electromagnet) can be disposed adjacent the distribution tool 404 to apply a magnetic field to the magnetizable abrasive particles 402.

According to the embodiment of FIG. 4, the distribution tool 404 comprises carrier member 428 having a dispensing surface 432 and a back surface 434. The carrier member 428 can define cavities 430 that are open to the dispensing surface 432. More particularly, the cavities 430 extend into carrier member 428 from cavity openings 436 at the dispensing surface 432. Optionally, a compressible resilient layer 438 is secured to back surface 434. The cavities 430 can be disposed in an array or pattern.

Typically, the cavity openings 436 of the carrier member 428 can be rectangular; however, this is not a requirement. The length, width, and depth of the cavities 420 in the carrier member 428 will generally be determined at least in part by the shape and size of the magnetizable abrasive particles 402 with which they are to be used. For example, if the magnetizable abrasive particles 402 are shaped as equilateral triangular platelets, then the lengths of individual cavities should be from 1.1-1.2 times the maximum length of a side of the magnetizable abrasive particles 402, the widths of individual cavities 430 are from 1.1-2.5 times the thickness of the magnetizable abrasive particles 402, and the respective depths of the cavities 430 are 1.0 to 1.2 times the width of the magnetizable abrasive particles 402 if the magnetizable abrasive particles 402 are to be contained within the cavities 430.

Alternatively, for example, if the magnetizable abrasive particles 402 are shaped as equilateral triangular plates, then the lengths of individual cavities 430 could be less than that of an edge of the magnetizable abrasive particles 402, and/or the respective depths of the cavities 430 could be less than that of the width of the magnetizable abrasive particles 402 if the magnetizable abrasive particles 402 are to protrude from the cavities 430. Similarly, the width of the cavities 430 could be selected such that a single magnetizable abrasive particle 402 fits within each one of the cavities 430.

Optionally, longitudinally-oriented standoff members 460 can be disposed along opposite edges (e.g., using adhesive or other means) of the dispensing surface 432. The standoffs 460 can provide a height or distance to keep the backing (not shown) from contacting the distribution surface 432.

If present, the longitudinally-oriented standoff members 460 may have any height, width and/or spacing (they have a height of from about 0.1 mm to about 1 mm, a width of from about 1 mm to about 50 mm, and a spacing of from about 7 to about 24 mm). Individual longitudinally-oriented standoff members may be, for example, continuous (e.g., a rib) or discontinuous (e.g., a segmented rib, or a series of posts). In the case, that the distribution tool 404 comprises a web or belt, the longitudinally-oriented standoff members are typically parallel to the machine direction.

Suitable carrier members 428 may be rigid or flexible, but are sufficiently flexible to permit use of normal web handling devices such as rollers. According to some embodiments, the carrier member 428 comprises metal and/or organic polymer. Such organic polymers are moldable, have low cost, and are reasonably durable when used in the abrasive particle deposition process of the present disclosure.

The distribution tool 404 can be in the form of, for example, an endless belt (e.g., endless belt as shown in FIG. 2), a sheet, a continuous sheet or web, a coating roller, a sleeve mounted on a coating roller, or die. If the distribution tool 404 is in the form of a belt, sheet, web, or sleeve, it will have a contacting surface and a non-contacting surface. It should be understood with any of the disclosed embodiments that one of the backing and the distribution tool can be moved relative to the other of the backing and distribution tool. For example, the distribution tool 404 can utilize a belt and the backing can move relative to the belt (i.e. at a higher or lower rate of speed). According to other embodiments, the distribution tool may be stator and the backing can move relative to the distribution tool. In yet further embodiments, the distribution tool can move while the backing can remain stator. The apparatuses and systems described can be part of a method of making an abrasive article, in particular, the method can be that of a continuous process or a batch process.

The topography of the abrasive article formed by the method will have the inverse of the pattern of the contacting surface of the production tool. The pattern of the contacting surface of the production tool will generally be characterized by a plurality of cavities or recesses. The opening of these cavities can have any shape, regular or irregular, such as, for example, a rectangle, semicircle, circle, triangle, square, hexagon, or octagon. The walls of the cavities can be vertical or tapered. The pattern formed by the cavities can be arranged according to a specified plan or can be random.

Further distribution tools that can be used with the magnetizable abrasive particles disclosed herein can be found in United States which are each incorporated herein by reference in their entirety.

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

The following embodiments are intended to be illustrative of the present disclosure and not limiting.

VARIOUS NOTES & EXAMPLES

Example 1 is a method of making an abrasive layer on a backing. The method can comprise the steps of: providing a distribution tool having a dispensing surface with cavities, providing a backing having a first major surface, supplying magnetizable abrasive particles to the dispensing surface such that at least one of the magnetizable abrasive particles is disposed in a respective one of the cavities, applying a magnetic field to retain the magnetizable abrasive particles disposed in the cavities, aligning the backing with the dispensing surface with the first major surface facing the dispensing surface, transferring the magnetizable abrasive particles from the cavities to the backing, and sequent to or simultaneous with transferring the abrasive particles, removing or changing a magnetic field so the magnetic field no longer retains the magnetizable abrasive particles in the cavities.

In Example 2, the subject matter of Example 1 optionally includes: providing a layer of a first curable binder precursor disposed on at least a portion of the first major surface; attaching the magnetizable abrasive particles to the first curable binder precursor layer; and at least partially curing the layer of the first curable binder material precursor to provide an at least partially cured abrasive layer secured to the backing.

In Example 3, the subject matter of Example 2 optionally includes disposing a second curable binder material precursor onto the at least partially cured abrasive layer, and at least partially curing the second curable binder material precursor.

In Example 4, the subject matter of any one or more of Examples 1-3 optionally includes supplying an excess of magnetizable abrasive particles to the dispensing surface such that more magnetizable abrasive particles are provided than the number of cavities, wherein a majority of the cavities have at least one of the magnetizable abrasive particles disposed therein, and removing at least a portion of the excess magnetizable abrasive particles not disposed within a cavity after filling step from the dispensing surface.

In Example 5, the subject matter of Examples 1-3 can further comprise urging the magnetizable abrasive particles to direct the magnetizable abrasive particles into the cavities using the magnetic field.

In Example 6, the subject matter of any one or more of Examples 1-5 optionally include inverting the distribution tool relative to the backing such that the magnetizable abrasive particles face the first major surface prior to or during transferring the magnetizable abrasive particles from the cavities.

In Example 7, the subject matter of Example 6 optionally includes wherein the dispensing surface is positioned to allow the force of gravity to slide the magnetizable abrasive particles into the cavities and the dispensing surface is inverted during the transferring step to allow the force of gravity to slide the magnetizable abrasive particles out of the cavities.

In Example 8, the subject matter of any one or more of Examples 1-7 optionally include wherein removing or changing the magnetic field includes at least one of: reversing a polarity of the magnetic field to push the magnetizable abrasive particles out of the cavities, moving the distribution tool relative to magnetic tool to reduce the magnetic field, eliminating the magnetic field by switching off an electromagnet that produces the magnetic field, or providing a second magnetic field of greater strength than and in substantially opposing direction from the magnetic field to push the magnetizable abrasive particles out of the cavities.

In Example 9, the subject matter of any one or more of Examples 1-8 optionally include wherein the magnetizable abrasive particles comprise triangular platelets.

Example 10 is an abrasive particle positioning system. The system can comprise: a distribution tool comprising: a carrier member having a dispensing surface and a back surface opposite the dispensing surface, wherein the carrier member has cavities formed therein, wherein the cavities extend into the carrier member and are open to the dispensing surface; magnetizable abrasive particles removably disposed within at least some of the cavities; and a magnet applying a magnetic field to retain the magnetizable abrasive particles disposed in the cavities or remove the magnetizable abrasive particles from the cavities.

In Example 11, the subject matter of Example 10 optionally includes wherein the carrier member comprises a polymer and is flexible.

In Example 12, the subject matter of any one or more of Examples 10-11 optionally include wherein the distribution tool comprises an endless belt.

In Example 13, the subject matter of any one or more of Examples 10-12 optionally include each of the magnetizable abrasive particles comprises a shaped ceramic body having at least one surface, and one or more magnetic layers are disposed on at least a portion of the at least one surface of the shaped ceramic body.

In Example 14, the subject matter of any one or more of Examples 10-13 optionally the magnet urges the magnetizable abrasive particles into the cavities of the carrier member.

In Example 15, the subject matter of any one or more of Examples 10-14 optionally include wherein the magnetizable abrasive particles comprise triangular platelets.

Example 16 is a coated abrasive article fabrication apparatus. The apparatus can comprise: a distribution tool having a dispensing surface with a plurality of cavities, a web path for a backing guiding the backing into close proximity with the distribution tool such that a first major surface of the backing is positioned facing the dispensing surface, magnetizable abrasive particles removably received in the plurality of cavities, and a magnet applying a magnetic field to retain the magnetizable abrasive particles disposed in the cavities, magnetizable abrasive particles are transferred from the plurality of cavities to the backing as the backing and the distribution tool come into the close proximity, and the magnetic field that retains the magnetizable abrasive particles in the cavities is selectively removed or changed prior to or simultaneous with transfer of the magnetizable abrasive particles from the plurality of cavities.

In Example 17, the subject matter of Example 16 optionally includes the distribution tool includes a carrier member that is formed of a polymer and is flexible.

In Example 18, the subject matter of any one or more of Examples 16-17 optionally include the distribution tool comprises an endless belt.

In Example 19, the subject matter of any one or more of Examples 16-18 optionally include each of the magnetizable abrasive particles comprises a shaped ceramic body having at least one surface, and one or more magnetic layers are disposed on at least a portion of the at least one surface of the shaped ceramic body.

In Example 20, the subject matter of any one or more of Examples 16-19 optionally include the magnet urges the magnetizable abrasive particles into the cavities of the carrier member.

Example 21 is a method of making an abrasive layer on a backing. The method can comprise the steps of: providing a distribution tool having a dispensing surface with cavities; providing a backing having a first major surface, supplying magnetizable abrasive particles to the dispensing surface such that at least one of the magnetizable abrasive particles is disposed in a respective one of the cavities, applying a vacuum to retain the magnetizable abrasive particles disposed in the cavities, aligning the backing with the dispensing surface with the first major surface facing the dispensing surface, transferring the magnetizable abrasive particles from the cavities to the resin coated backing and attaching the magnetizable abrasive particles to the resin layer, and sequent to or simultaneous with transferring the abrasive particles, applying a magnetic field to the magnetizable abrasive particles to at least partially facilitate transferring the magnetizable abrasive particles from the cavities.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention can be determined with reference to the appended claims, along with the full scope of equivalents to which such claims are entitled.

WORKING EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Missouri, or may be synthesized by known methods.

Material abbreviations used in the Examples are described in Table 1, below.

Unit Abbreviations Used in the Examples:
° C.: degrees Centigrade
cm: centimeter
$g/m^2$: grams per square meter
mm: millimeter Material abbreviations used in the Examples are described in Table 1, below.

TABLE 1

| ABBREVIATION | DESCRIPTION |
| --- | --- |
| PR | Resole phenolic resin, a 1.5:1 to 2.1:1 (phenol:formaldehyde) condensate catalyzed by 2.5% potassium hydroxide, obtained as GP 8339 R-23155B from Georgia Pacific Chemicals, Atlanta, Georgia. |
| PME | Propylene glycol methyl ether, obtained as "DOWANOL PM" from DOW Chemical Company, Midland, Michigan. |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 1.4 mm (side length) × 0.35 mm (thickness), with a draft angle approximately 98 degrees. |
| TOOL | A tooling having vertically-oriented triangular cavities generally described in patent publication WO2015/100220 and configured as shown in FIG. 3A-3C in WO2015/100220, wherein length = 1.875 mm, width = 0.785 mm, depth = 1.62 mm, bottom width = 0.328 mm) arranged in a rectangular array (length-wise pitch = 1.978 mm, width-wise pitch = 0.886 mm) with all long dimensions in the same direction. |

Preparation of Magnetizable Abrasive Particles

SAP was coated with 304 stainless steel using physical vapor deposition with magnetron sputtering. 304 Stainless steel sputter target, described by Barbee et al. in Thin Solid Films, 1979, vol. 63, pp. 143-150, deposited as the magnetic ferritic body centered cubic form. The apparatus used for the preparation of 304 stainless steel film coated abrasive particles (i.e., magnetizable abrasive particles) was disclosed in U.S. Pat. No. 8,698,394 (McCutcheon et al.). The physical vapor deposition was carried out for 4 hours at 1.0 kilowatt at an argon sputtering gas pressure of 10 millitorr (1.33 pascal) onto 51.94 grams of SAP. The density of the coated SAP was 4.0422 grams per cubic centimeter. The weight percentage of metal coating in the coated SAP was approximately 2% and the coating thickness is 1.5 micrometers.

Example 1

A section of cloth backing obtained as ERATEX QUALITY N859 P39 YB1700 from Gustav Ernstmeier GmbH & Co. KG, Herford, Germany, was coated with 209.2 $g/m^2$ of a phenolic make resin consisting of 49.2 parts of PR, 40.6 parts of calcium metasilicate (obtained as WOLLASTOCOAT from NYCO Company, Willsboro, NY), and 10.2 parts of water. A brush was used to apply the resin.

Figure 5:
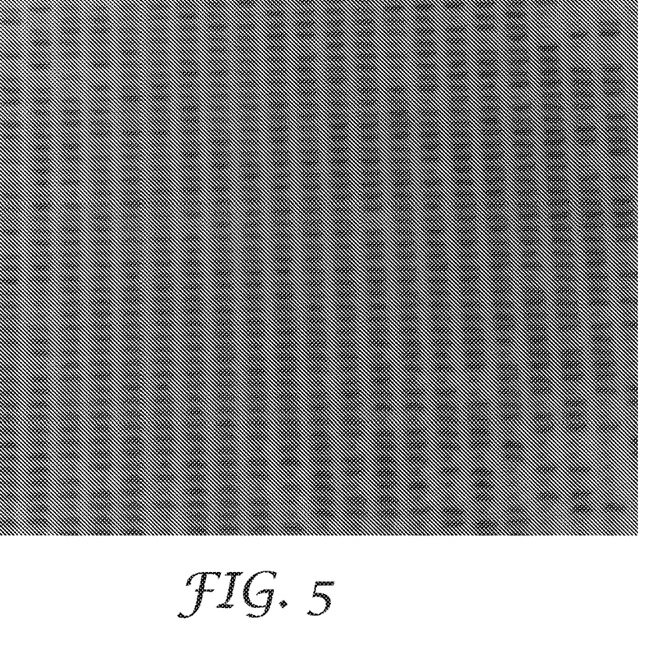
FIG. 5 is a digital image of the exterior surface of the distribution tool receiving magnetizable abrasive articles therein in accordance with Example 1.
Figure 6:
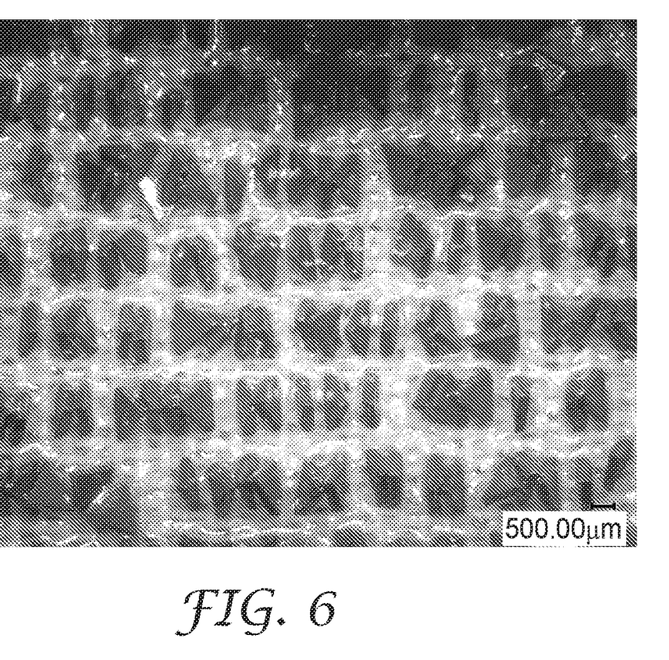
FIG. 6 is a digital image of a coated abrasive article with magnetizable abrasive particles oriented and positioned in accordance with Example 1.

A 2 inches (5.08 cm)×2 inches (5.08 cm) section of TOOL was filled with coated SAP particles by placing 50 grams of coated SAP on top of the TOOL and then shaking and tapping the TOOL to allow the particles to fill the cavities. Excess particles were removed with a gentle stream of air directed across the surface. The tooling was then placed on top of a 4 inches (10.16 cm)×2 inches (5.08 cm)×1 inch (2.54 cm) Neodymium magnet (Grade N42), which was magnetized through the 1-inch thickness. The entire assembly of magnet and TOOL was inverted. All of the particles were retained in the TOOL as shown in FIG. 5. While still inverted, the assembly of magnet and TOOL was placed over the coated cloth backing at a gap distance of 0.010 inch (0.254 mm) and the magnet was quickly removed. The particles were released from the TOOL and affixed to the coated cloth backing. The particles retained orientation as shown in FIG. 6. The sample was cured in an oven at 90° C. for 90 minutes.

Comparative Example A

Figure 7:
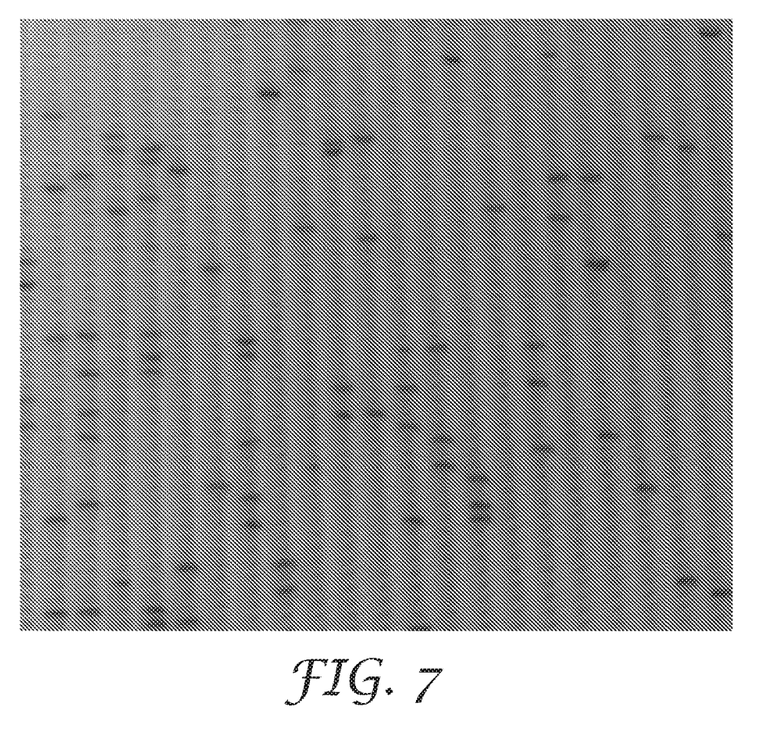
FIG. 7 is a digital image of the exterior surface of the distribution tool after undergoing a process described in accordance with Comparative Example A.
Figure 8:
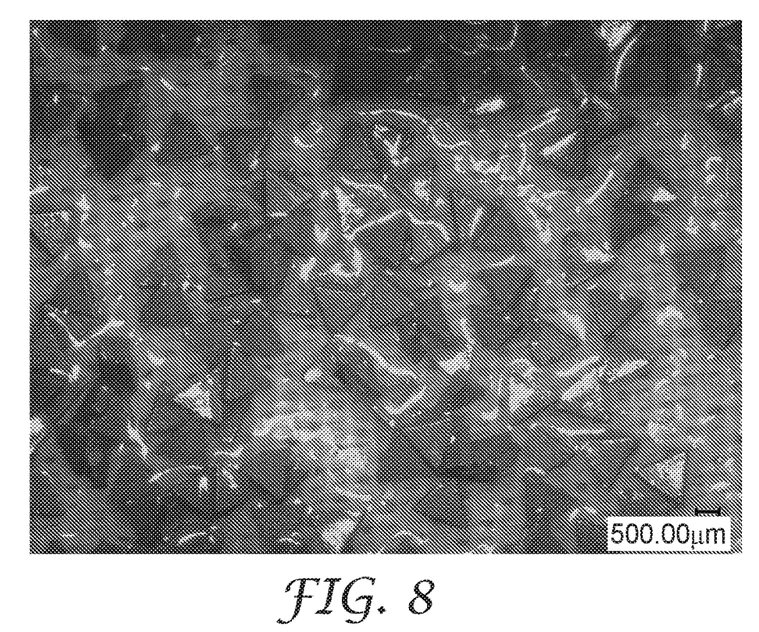
FIG. 8 is a digital image of a coated abrasive article with magnetizable abrasive particles after having undergoing a process in accordance with Comparative Example A.

The procedure generally described in EXAMPLE 1 was repeated, with the exception that the procedure was carried out without ever being subjected to the magnetic field (i.e. no magnet was used). Approximately 90% of the particles fell out immediately upon inversion as shown in FIG. 7. Since the particles were not retained in the TOOL, they were not able to retain orientation on the coated backing, as shown in FIG. 8.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The invention claimed is:

1. A method of making a coated abrasive article comprising the steps:
    providing a distribution tool having a dispensing surface with cavities;
    providing a backing having a first major surface, the backing comprising a layer of a first curable binder precursor disposed on at least a portion of the first major surface;
    supplying magnetizable abrasive particles to the dispensing surface such that at least one of the magnetizable abrasive particles is disposed in a respective one of the cavities, wherein during the supplying step the dispensing surface is positioned to allow the force of gravity to slide the magnetizable abrasive particles into the cavities;
    applying a first magnetic field to retain the magnetizable abrasive particles disposed in the cavities;
    inverting the distribution tool relative to the backing such that the magnetizable abrasive particles are retained by the first magnetic field against the force of gravity;
    aligning the backing with the dispensing surface with the first major surface facing the dispensing surface and has a distance from the dispensing surface to keep the backing from contacting the dispensing surface;
    applying a second magnetic field to urge the magnetizable abrasive particles out from the cavities onto the backing and attaching the magnetizable abrasive particles to the first curable binder precursor layer; and
    at least partially curing the layer of the first curable binder material precursor to provide an at least partially cured abrasive layer secured to the backing.

2. The method of claim 1, further comprising disposing a second curable binder material precursor onto the at least partially cured abrasive layer, and at least partially curing the second curable binder material precursor.

3. The method of claim 1, further comprising:
    supplying an excess of magnetizable abrasive particles to the dispensing surface such that more magnetizable abrasive particles are provided than the number of cavities, wherein a majority of the cavities have at least one of the magnetizable abrasive particles disposed therein; and
    removing at least a portion of the excess magnetizable abrasive particles not disposed within a cavity.

4. The method of claim 1, further comprising urging the magnetizable abrasive particles to direct the magnetizable abrasive particles into the cavities using the magnetic field.

5. The method of claim 1, wherein the magnetizable abrasive particles face the first major surface prior to or during transferring the magnetizable abrasive particles from the cavities.

6. The method of claim 5, wherein during the transferring, the force of gravity allows the magnetizable abrasive particles to slide out of the cavities.

7. The method of claim 1, wherein removing or changing the magnetic field includes at least one of: reversing a polarity of the magnetic field to push the magnetizable abrasive particles out of the cavities, moving the distribution tool relative to magnetic tool to reduce the magnetic field, eliminating the magnetic field by switching off an electromagnet that produces the magnetic field, or providing a second magnetic field of greater
    strength than and in substantially opposing direction from the magnetic field to push the magnetizable abrasive particles out of the cavities.

8. The method of claim 1, wherein the magnetizable abrasive particles comprise triangular platelets.

* * * * *